(12) United States Patent
Hamilton

(10) Patent No.: US 8,840,804 B2
(45) Date of Patent: Sep. 23, 2014

(54) CALCIUM REDUCTION COMPOSITION AND METHOD

(75) Inventor: Scott Hamilton, Santa Paula, CA (US)

(73) Assignee: United Chemical Corp., Piru, CA (US)

( * ) Notice: Subject to any disclaimer, the term of this patent is extended or adjusted under 35 U.S.C. 154(b) by 997 days.

(21) Appl. No.: 12/417,912

(22) Filed: Apr. 3, 2009

(65) Prior Publication Data

US 2009/0206298 A1  Aug. 20, 2009

Related U.S. Application Data

(63) Continuation-in-part of application No. 11/951,469, filed on Dec. 6, 2007.

(51) Int. Cl.
| | |
|---|---|
| *C02F 5/02* | (2006.01) |
| *C02F 5/08* | (2006.01) |
| *A01N 59/00* | (2006.01) |
| *C11D 17/06* | (2006.01) |
| *C02F 1/00* | (2006.01) |
| *B03D 3/06* | (2006.01) |
| *C02F 5/12* | (2006.01) |
| *C02F 5/04* | (2006.01) |
| *C02F 103/42* | (2006.01) |
| *C02F 1/66* | (2006.01) |

(52) U.S. Cl.
CPC ............ *C02F 5/125* (2013.01); *C02F 2103/42* (2013.01); *C02F 5/04* (2013.01); *C02F 1/66* (2013.01)
USPC ........... 252/175; 504/119; 510/247; 510/446; 510/447; 210/696

(58) Field of Classification Search
CPC ............ C11D 3/06; C11D 3/10; C11D 3/361; C11D 17/0052; C11D 17/0065; C09K 8/24; C09K 8/32; C09K 8/36; C02F 8/24; C02F 1/5245; C02F 5/083

USPC ........... 504/119; 252/175; 510/247, 446, 447; 210/696

See application file for complete search history.

(56) References Cited

U.S. PATENT DOCUMENTS

| | | | | |
|---|---|---|---|---|
| 4,781,805 | A | | 11/1988 | Dahlgren |
| 4,906,384 | A | * | 3/1990 | Hamilton ...................... 210/697 |
| 5,045,211 | A | * | 9/1991 | Hamilton ...................... 210/697 |
| 5,364,959 | A | | 11/1994 | Dyroff et al. |
| 5,474,878 | A | | 12/1995 | Sakuma |
| 5,700,377 | A | | 12/1997 | Cox |
| 6,625,824 | B1 | | 9/2003 | Lutz et al. |
| 2005/0040116 | A1 | * | 2/2005 | Purdy et al. ................... 210/749 |

FOREIGN PATENT DOCUMENTS

WO    2007/040588    4/2007

OTHER PUBLICATIONS

Super Sequa-Sol replaces HydroQuest 100, http://poolcenter.com/chemicals_poolstor_specialty_chemicals.html; Sep. 24, 2008.

* cited by examiner

*Primary Examiner* — Patrick Ryan
*Assistant Examiner* — Aaron Greso
(74) *Attorney, Agent, or Firm* — Fish & Tsang LLP

(57) ABSTRACT

A formula and method for reducing water hardness includes the combination of a sulfate donor, salt of phosphoric acid, and salt of sulfamic acid. Preferred formulas include effective amounts of sodium bisulfate, sodium hexametaphosphate, and sulfamic acid. In a swimming pool, preferred formulas are effective in reducing calcium to under 200 ppm within a two day period. In addition, preferred formulas provide ongoing effectiveness in suppressing scaling, staining and cloudy water.

8 Claims, 1 Drawing Sheet

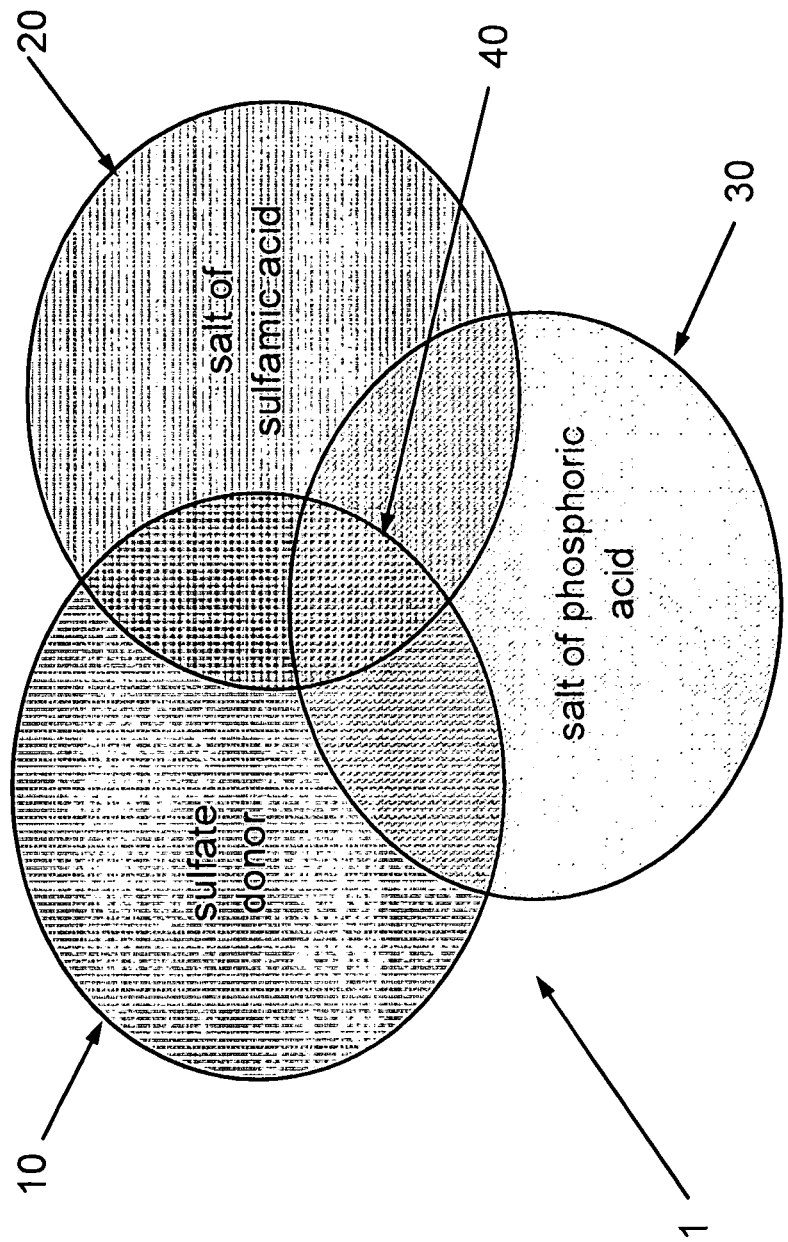

CALCIUM REDUCTION COMPOSITION AND METHOD

This application is a continuation-in-part of non-provisional application Ser. No. 11/951,469 filed Dec. 6, 2007. All prior applications are incorporated by reference in their entirety.

FIELD OF THE INVENTION

The field of the invention is water treatment for swimming pools.

BACKGROUND

Water in swimming pools is often contaminated by foreign substances, including, for example, tree branches, leaves, bacteria, and fungus. Metal ions from minerals can easily build up in the pool and cause the water to become cloudy, develop mineral deposits, and stain the walls or floor of the swimming pool. Calcium and magnesium deposits are particularly common in swimming pools. Such contamination is often difficult and expensive to clean. Thus, reducing pool water hardness is desirous to prevent deposits from forming in swimming pools and clouding the water.

U.S. Pat. No. 4,781,805 to Dahlgren teaches applying a current to the water using silver and aluminum alloy electrodes, and alternating that current to cause the calcium ions to agglomerate. This also requires a filter to be used to remove the solid calcium particles. While this prevents the pH of the water from changing, it also requires a great deal of electricity, which could be very costly. Dahlgren and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for improved water treatment methods that provide a simple and effective reduction of water hardness in swimming pools.

SUMMARY OF THE INVENTION

The inventive subject matter provides apparatus, systems and methods in which water hardness is reduced through chemical application of a combination of a sulfate donor, a salt of phosphoric acid, and a salt of sulfamic acid. Preferably the concentration of calcium is reduced by at least 200 ppm, 400 ppm, or even 500 ppm. In an exemplary embodiment, the concentration of calcium in the water is reduced by almost half.

Preferred formulas include effective amounts of sodium bisulfate, sodium hexametaphosphate, and sulfamic acid. Experimental work has demonstrated that the dry weight ratio between sodium bilsulfate and sulfamic acid should be at least 2:1. Especially preferred formulas include at least 40 wt % sodium bisulfate, at least 40 wt % sodium hexametaphosphate, and at least 20 wt % sulfamic acid. These percentages could vary by at least 3%, at least 5%, at least 8% or at least 10% without departing from the scope of the invention. Percentages that vary by more than 20% typically fail to reduce the hardness of the water.

As used herein, the term "salt" includes the dry form and a solvated form. Thus, a claim to "a solution for treating water in a swimming pool, comprising: a sulfate donor; a salt of phosphoric acid; and a salt of sulfamic acid" should be interpreted to mean a liquid form in which all three salts are at least partially solvated.

In a swimming pool, preferred formulas are effective in reducing water hardness to under 200 ppm. In addition, preferred formulas provide effective results within a week, and could typically reduce the hardness of the water within a day.

Preferred formulas could be introduced into a swimming pool in a variety of ways, including addition of liquid and/or solid forms. In addition, components of the formulas could be added separately to the pool, or can be combined and added together in solid or liquid form. After the formula is added to the swimming pool in liquid or solid form, a swimming pool pump is preferably operated for at least 8 hours, at least 16 hours, at least 24 hours, at least 30 hours, at least 36 hours, or at least 42 hours so that much of the precipitated calcium is removed from the water by the filtration system. Since salts are used, the pH of the pool is at most 7.2 pH, 7.5 pH, 7.8 pH, 8 pH, or at most 8.2 pH. In a preferred embodiment, the pH of the pool never exceeds 8 pH.

Those skilled in the art will appreciate that the principles taught herein could be readily applied to other applications besides swimming pools. Of particular interest are applications having large volumes of water or containers of stagnant water, including for example, tanks, reservoirs or boilers.

Various objects, features, aspects and advantages of the inventive subject matter will become more apparent from the following detailed description of preferred embodiments.

BRIEF DESCRIPTION OF THE DRAWING

FIG. 1 is a schematic of a preferred chemical formulation for water hardness.

DETAILED DESCRIPTION

FIG. 1 generally shows a Venn diagram 1 having circles that correspond to sets for a sulfate donor 10, a salt of phosphoric acid 20, and a salt of sulfamic acid 30. the intersection of the three sets 10, 20, 30 is a set of preferred formulations 40.

The sulfate donor of set 10 can be any suitable sulfate donor that is soluble in water and increases the concentration of hydrogen ions in water, including for example, potassium sulfate, lithium sulfate, and sodium sulfate. Preferably, the sulfate donor is sodium bisulfate ($NaHSO_4$). The solution preferably contains at least 30% wt of sodium bisulfate and even more preferably at least 40% wt of sodium bisulfate. An effective amount of sulfate donor, when mixed with the salt of phosphoric acid and a salt of sulfamic acid in a swimming pool, is that amount necessary to ensure that the pH of the water does not exceed 8 pH, and more preferably 7.5 pH.

The effective amount of the salt of phosphoric acid, when dispersed in a swimming pool or other vessel, is that amount necessary to lower the hardness by at least 30%, when used in combination with the other components of the formula. The dry weight ratio between the salt of phosphoric acid and the sulfate donor is preferably 1:1, and the dry weight ratio between the salt of phosphoric acid and the salt of sulfamic acid is preferably 2:1. The dry weight percent of the salt of phosphoric acid is preferably at least 30 wt %, and more preferably at least 40 wt %. All suitable salts of phosphoric acid are contemplated, for example sodium hexametaphosphate ($Na_2OP_2O_5$), disodium phosphate, or tetrasodium pyrophosphate. Preferably, sodium hexametaphosphate is the only phosphoric acid salt, although a combination of salts of phosphoric acids could be used.

The salt of sulfamic acid could be any suitable sulfamic acid, for example potassium sulfamic acid, phenyl sulfamic acid, ammonium sulfamic acid, or sodium sulfamic acid. The salt of sulfamic acid is preferably sodium sulfamic acid ($H_2NSO_3H$), more preferably comprises at least 10 wt % of the solution, and most preferably comprises at least 10 or 20% wt of the solution.

The components of contemplated formulas could be mixed on-site, added individually to the swimming pool or other vessel, or could mixed and packaged in a bottle or capsule to aid in dispersing and measuring. When the components are provided separately, it is preferred that a ratio is enforced between or among the different components. Examples of enforcing a ratio include selling individual components with accompanying instructions regarding preferred ratios, providing a website that includes such instructions, or providing a measuring device in a package with the components.

In one embodiment, a controlled amount of at least one of sodium bisulfate, sodium hexametaphosphate, or sulfamic acid is added to the pool. As used herein, the term "controlled amount" means that the amount is measured in some manner. Preferably, the sodium bisulfate, sodium hexametaphosphate, and sulfamic acid are packaged in pre-defined ratios. Alternatively, a measuring device, such as a scooper, or a set of instructions describing the controlled amount could be included with the solution or chemical components. Preferably, the pre-packaged product is in a solid, granular form and is sprinkled into the swimming pool while the pump is running. The instructions could be made available to the user either in printed form and packaged with the solution or chemicals, or made available electronically via a website.

A ratio could also be enforced between the chemical solution and the total volume of liquid in the vessel. This ratio could be maintained in any suitable manner, including for example measuring a predetermined amount of each chemical before adding the chemical to the liquid, or tracking the volume or weight of each chemical as it is pumped or otherwise added to the liquid. The chemical solution is preferably added in or around a pump or mixing device, for example a swimming pool pump, to aid in maximizing the dispersal of the chemical in the liquid container.

All suitable solid forms of the contemplated formulas are contemplated, including for example a granular composition or one or more dissolving tablets. A solid block could also be presented that could be broken up into a granular composition prior to adding the product to the pool to increase the effectiveness of the product. All suitable liquid forms are also contemplated, including containers that provide only enough composition for a single treatment, and containers that provide enough composition for multiple treatments.

The present invention may be further understood in light of the following examples, which are illustrative in nature and are not to be considered as limiting the scope of the invention.

At present, the most preferred embodiment comprises 40 wt % sodium bisulfate, 20% sulfamic acid, and 40% sodium hexametaphosphate. In one example, a single liter of this embodiment effectively treated a 15,000 gallon pool, reducing a hardness of 1030 ppm to a hardness of 525 ppm within 24 hours. In another example, a single liter of this embodiment effectively treated a 16,000 gallon pool to reduce the hardness of 600 ppm to a hardness of 300 ppm within 24 hours.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of reducing water hardness in a pool, comprising:
    introducing a controlled amount of sodium bisulfate, sodium hexametaphosphate, and sulfamic acid to a composition, wherein the dry weight ratio between the controlled amount of sodium hexametaphosphate and the controlled amount of sulfamic acid is at least 2:1;
    introducing the composition to water in the pool to precipitate calcium in the pool; and
    filtering the pool for at least 8 hours to remove the precipitated calcium from the water.

2. The method of claim 1, wherein the dry weight ratio between the controlled amount of sodium bisulfate and the controlled amount of sulfamic acid is at least 2:1.

3. The method of claim 1, wherein the controlled amount of sodium bisulfate is at least 30 wt % sodium bisulfate.

4. The method of claim 1, wherein the controlled amount of sodium hexametaphosphate is at least 40 wt % of the composition, and the controlled amount of sulfamic acid is at least 20 wt % of the composition.

5. The method of claim 1, further comprising operating a swimming pool pump for at least 24 hours to remove the amount of precipitated calcium from the water.

6. The method of claim 5, wherein the removed amount of precipitated calcium reduces a hardness of the water by at least 200 ppm.

7. The method of claim 1, wherein the composition comprises at most 40 wt % sodium bisulfate, at least 30 wt % sodium hexametaphosphate, and at least 10 wt % sulfamic acid.

8. The method of claim 5, wherein the removed amount of precipitated calcium reduces a hardness of the water by at least 400 ppm.

\* \* \* \* \*